United States Patent
Hong et al.

(10) Patent No.: US 9,955,543 B2
(45) Date of Patent: Apr. 24, 2018

(54) LAMP CONTROL DEVICE AND CONTROL METHOD THEREFOR

(71) Applicants: SILICON WORKS CO., LTD., Daejeon-si (KR); HYUNDAI IHL CORPORATION, Gyeongju-si, Gyeongsangbuk-do (KR)

(72) Inventors: Ju Pyo Hong, Daejeon (KR); Joo Wan Ha, Bucheon-si (KR); Sung Hwan Kim, Yangsan-si (KR); Ju Hyun Lee, Daejeon (KR); Hai Feng Jin, Daejeon (KR); Tae Young Yoo, Cheongju-si (KR); Wanyuan Qu, Daejeon (KR); Se Won Lee, Daejeon (KR); Byeong Ho Jeong, Daejeon (KR); Hyun Il Park, Daegu (KR)

(73) Assignees: SILICON WORKS CO., LTD., Daejeon-si (KR); HYUNDAI IHL CORPORATION, Gyeongju-si, Gyeongsangbuk-Do (KR)

( * ) Notice: Subject to any disclaimer, the term of this patent is extended or adjusted under 35 U.S.C. 154(b) by 0 days.

(21) Appl. No.: 15/543,343
(22) PCT Filed: Jan. 7, 2016
(86) PCT No.: PCT/KR2016/000142
§ 371 (c)(1),
(2) Date: Jul. 13, 2017
(87) PCT Pub. No.: WO2016/114526
PCT Pub. Date: Jul. 21, 2016

(65) Prior Publication Data
US 2018/0007756 A1 Jan. 4, 2018

(30) Foreign Application Priority Data
Jan. 13, 2015 (KR) .................. 10-2015-0004623

(51) Int. Cl.
*B60Q 1/14* (2006.01)
*H05B 33/08* (2006.01)
(Continued)

(52) U.S. Cl.
CPC .......... *H05B 33/0845* (2013.01); *B60Q 1/34* (2013.01); *B60Q 1/44* (2013.01); *H05B 33/0827* (2013.01);
(Continued)

(58) Field of Classification Search
CPC .......... B60Q 1/26; B60Q 1/2696; B60Q 1/46
(Continued)

(56) References Cited

U.S. PATENT DOCUMENTS

| | | | | |
|---|---|---|---|---|
| 7,345,433 B2* | 3/2008 | Bacon | ............... | H05B 33/0812 315/291 |
| 2005/0236999 A1* | 10/2005 | Ito | ..................... | H05B 33/0815 315/77 |
| 2015/0069906 A1* | 3/2015 | Niedermeier | ...... | H05B 33/0803 315/77 |

FOREIGN PATENT DOCUMENTS

| | | |
|---|---|---|
| JP | 09-301295 | 11/1997 |
| JP | 3181944 | 2/2013 |

(Continued)

OTHER PUBLICATIONS

International Search Report for International Application No. PCT/KR2016/000142, dated May 19, 2016.
(Continued)

*Primary Examiner* — Thuy Vinh Tran
(74) *Attorney, Agent, or Firm* — Kile Park Reed & Houtteman PLLC

(57) ABSTRACT

A lamp control device may include: a lamp including an LED module having a plurality of LED channels; a converter configured to receive a voltage corresponding to a turn signal, convert the voltage into an output voltage and internal voltage, and supply the output voltage to the LED module; and a controller configured to start counting a preset delay time when the internal voltage is supplied from the converter, and control the plurality of LED channels to sequentially light up at intervals of the delay time.

15 Claims, 5 Drawing Sheets

(51) Int. Cl.
  *B60Q 1/34* (2006.01)
  *B60Q 1/44* (2006.01)
  *H05B 37/02* (2006.01)
  *B60Q 1/46* (2006.01)
  *B60Q 1/26* (2006.01)

(52) U.S. Cl.
  CPC ........... *H05B 37/0281* (2013.01); *B60Q 1/26* (2013.01); *B60Q 1/2696* (2013.01); *B60Q 1/46* (2013.01)

(58) Field of Classification Search
  USPC .................................................. 315/77, 291
  See application file for complete search history.

(56) References Cited

FOREIGN PATENT DOCUMENTS

| KR | 10-0355420 | 10/2002 |
| KR | 10-2010-0123153 | 11/2010 |
| KR | 10-1208078 | 12/2012 |

OTHER PUBLICATIONS

Written Opinion with English Translation for International Application No. PCT/2016/000142, dated May 19, 2016.

\* cited by examiner

LAMP CONTROL DEVICE AND CONTROL METHOD THEREFOR

BACKGROUND

1. Technical Field

The present disclosure relates to a lamp control technology, and more particularly, to a lamp control device for a vehicle, which is capable of improving stability and functionality, and a control method thereof.

2. Related Art

In general, a vehicle employs vehicle lamps for various uses, and the vehicle lamps may include a head lamp and a rear combination lamp.

Among the vehicle lamps, the read combination lamp includes a turn signal lamp, a brake lamp, a tail lamp and a back lamp, and is used to inform a driver in another vehicle of a driving intention and state of an ego vehicle, the vehicle following the ego vehicle.

Recently, with the rapid development of high-brightness light emitting diodes (LED), various vehicle lamps employing the LEDs have been developed. As the LEDs are employed as a light source, the designs of the vehicle lamps are diversified, and the number of LEDs constituting each of the vehicle lamps tends to increase with the design diversification.

However, the increase in number of LED channels constituting the vehicle lamp or the increase in number of LEDs for each channel may be limited depending on the installation environment. Furthermore, since each of the LED channels does not have uniform brightness, a light intensity difference may occur.

Among the vehicle lamps, the turn signal lamp is flickered when a vehicle in operation makes a turn, and used to inform the surrounding vehicles of the change of the driving direction. Such a turn signal lamp needs to drive the LEDs to exhibit an aesthetic sense, and needs to be enhanced to have an additional functionality.

A lamp control device according to the related art drives the lamp using an FET or BJT and OP-AMP, and additionally uses a pulse-width modulation generator and a voltage regulator for dimming control.

However, the lamp control device according to the related art may have a limit to the number of LED channels depending on the installation environment of a vehicle, and an error between parts may occur in offset or part arrangement.

Such an error between parts may cause a current deviation between LED channels, and the lamp control device according to the related art may not perform uniform brightness control between channels due to the current deviation.

SUMMARY

Various embodiments are directed to a lamp control device capable of stably controlling a vehicle lamp, and a control method thereof.

Also, various embodiments are directed to a lamp control device capable of sequentially lighting up a lamp with a direction indication function through counting of a preset delay time, thereby improving the aesthetic sense of a vehicle, and a control method thereof.

Also, various embodiments are directed to a lamp control device capable of switching a lamp for direction indication into an emergency lamp in response to an emergency stop signal of a vehicle, and a control method thereof.

In an embodiment, a lamp control device may include: a lamp including an LED module having a plurality of LED channels; a converter configured to receive a voltage corresponding to a turn signal, convert the voltage into an output voltage and internal voltage, and supply the output voltage to the LED module; and a controller configured to start counting a preset delay time when the internal voltage is supplied from the converter, and control the plurality of LED channels to sequentially light up at intervals of the delay time.

In another embodiment, a lamp control device may include: a lamp including first and second LED modules each having LED channels; a converter configured to receive a voltage corresponding to a turn signal, convert the voltage into an output voltage and internal voltage, and supply the output voltage to the first and second LED modules; a first controller configured to start counting a first delay time preset when the internal voltage is supplied from the converter, and control the plurality of first LED channels to sequentially light up at intervals of the first delay time; and a second controller configured to start counting a second delay time preset at the same time point as the first controller when the internal voltage is supplied from the converter, and control the plurality of second LED channels to sequentially light up at intervals of the first delay time after the second delay time has elapsed.

In another embodiment, there is provided a control method of a lamp control device that performs control using first and second controllers corresponding to first and second LED modules each having LED channels, respectively. The control method may include the steps of: (a) starting, by the first controller, counting a first delay time in response to a turn signal, and controlling the LED channels of the first LED module to sequentially light up at intervals of the first delay time; and (b) starting, by the second controller, counting a second delay time different from the first delay time at the same time point as the first controller in response to the turn signal, and controlling the LED channels of the second LED module to sequentially light up at intervals of the first delay time when the counting of the second delay time is completed.

According to the embodiments of the present invention, although the number of LED channels employed in the vehicle lamp is increased, the LED module can be stably driven.

Furthermore, the lamp control device and the control method can sequentially light up the lamp with the direction indication function through the counting of the preset delay time, thereby increasing the aesthetic sense of the vehicle.

Furthermore, the lamp control device and the control method can switch the lamp for direction indication into the function of an emergency lamp in response to the emergency stop signal, thereby improving the driving stability while preventing a vehicle accident.

DETAILED DESCRIPTION

Figure 1:
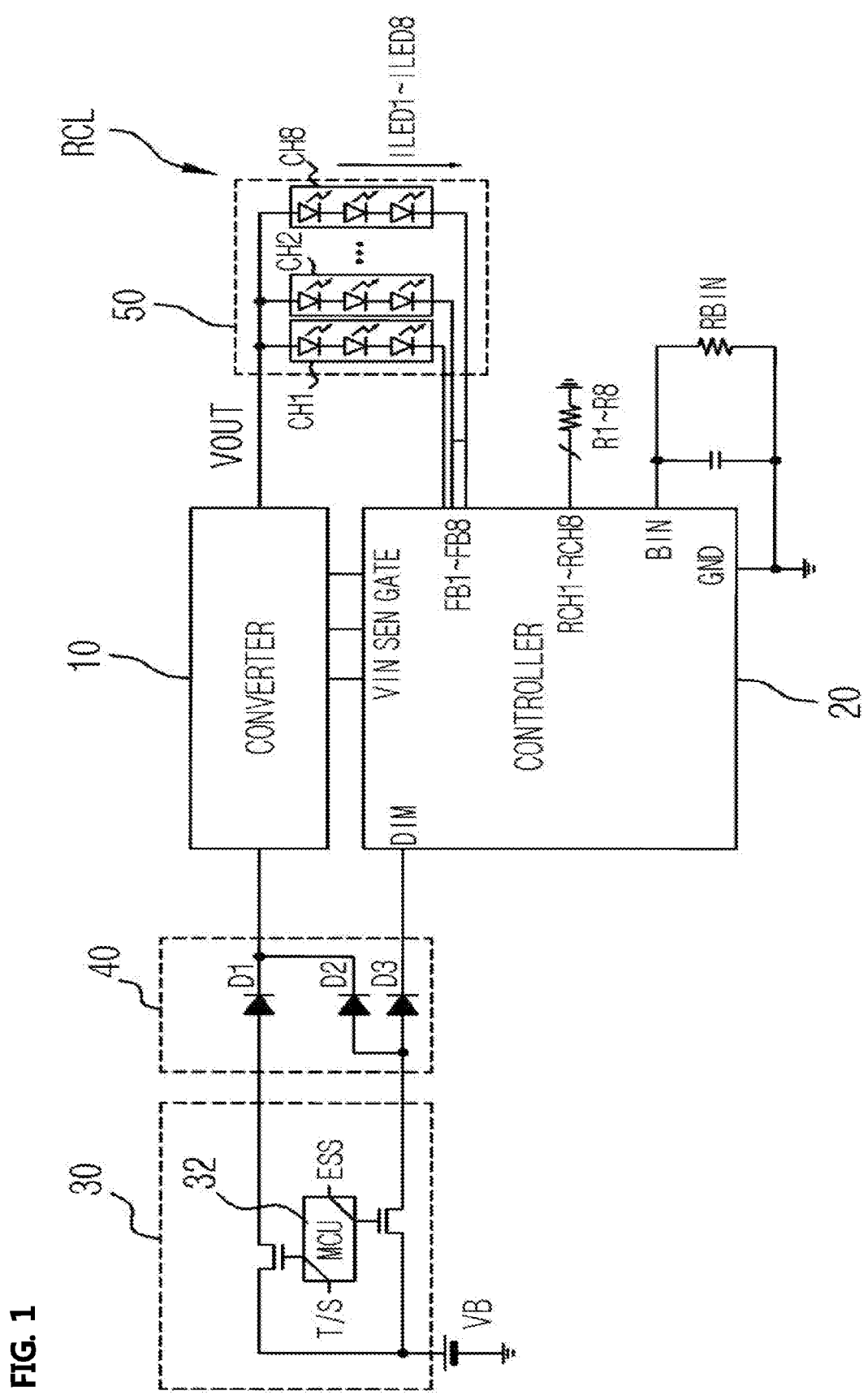
FIG. 1 illustrates a lamp control device according to a first embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

FIG. 1 illustrates a lamp control device according to a first embodiment of the present invention.

Referring to FIG. 1, the lamp control device according to the first embodiment of the present invention includes a lamp RCL, a converter 10 and a controller 20.

The lamp RCL includes one LED module 50 having a plurality of LED channels. The plurality of channels in the LED module 50 may be arranged in parallel. FIG. 1 exemplifies that one controller 20 drives LEDs of first to eighth channels CH1 to CH8 included in the LED module 50. For example, the lamp RCL may include a brake lamp, a tail lamp, a turn signal lamp and an emergency stop lamp of a vehicle or correspond to a rear combination lamp having a composite function for notifying a braking operation, a taillight function, and an emergency stop.

The lamp RCL may be divided into a lamp installed only on the vehicle body and lamps distributed to the vehicle body and a trunk, depending on the type of the vehicle. The first embodiment may be applied to the lamp installed only on the vehicle body, but not limited thereto.

A vehicle controller 30 includes an MCU (Micro Controller Unit) 32, and transmits a battery voltage VB to the converter 10 in response to a turn signal T/S, or transmits the battery voltage VB to the converter 10 in response to an emergency stop signal ESS.

A path unit 40 forms a path for transmitting the battery voltage VB to the converter 10 between the vehicle controller 30 and the converter 10, and forms for transmitting a dim signal DIM to the controller 20 between the vehicle controller 30 and the controller 20. The path unit 40 includes diodes D1 and D2 for forming a transmission path of the battery voltage VB and a diode D3 for forming a transmission path of the dim signal DIM.

The battery voltage VB is transmitted to the converter 10 through the diode D1, when the turn signal T/S is enabled. Also, the battery voltage VB is transmitted to the converter 10 through the diode D2, when the emergency stop signal ESS is enabled. The dim signal DIM is enabled when the emergency stop signal ESS is enabled, and transmitted to the controller 20 through the diode D3. For example, the dim signal DIM is enabled to a high level when the emergency stop signal ESS is enabled, and transmitted to the controller 20.

The converter 10 generates an output voltage VOUT and an internal voltage VIN using the battery voltage VB supplied thereto, supplies the output voltage VOUT to the LED module 50, and supplies the internal voltage VIN to the controller 20. For example, a buck converter may be used as the converter 10.

The controller 20 starts counting a preset delay time T1 when the internal voltage VIN is supplied from the converter 10 while the dim signal DIM is disabled, and sequentially turns on the first to eighth channels CH1 to CH8 of the LED module 50 whenever the counting of the delay time T1 is completed. At this time, the controller 20 may be configured to start counting when the internal voltage VIN reaches a preset target level, or start counting at a falling edge of a counting start signal Start (refer to FIG. 6) which is enabled when the internal voltage VIN reaches the preset target level. The delay time T1 may be set to more than a time during which a person can recognize that the LED module 50 is sequentially lit up on a channel basis.

The controller 20 may include switching elements (not illustrated) which form or block current paths between feedback voltage terminals FB1 to FB8 and channel resistor terminals RCH1 to RCH8 of the first to eighth channels CH1 to CH8. The switching elements are sequentially turned on whenever the preset delay time T1 is counted, and form the current paths between the feedback voltage terminals FB1 to FB8 and the channel resistor terminals RCH1 to RCH8. The first to eighth channels CH1 to CH8 of the LED module 50 are sequentially lit up in response to the formations of the current paths.

That is, when the turn signal T/S is enabled to transmit the battery voltage VB to the converter 10 through the path D1 and the internal voltage VIN is supplied from the converter 10, the controller 20 controls the first to eighth channels CH1 to CH8 to sequentially light up at intervals of the delay time T1, through the counting of the delay time T1. At this time, when the first to eighth channels CH1 to CH8 sequentially light up, it may indicate that the number of channels to emit light sequentially increases or decreases. Furthermore, when the first to eighth channels CH1 to CH8 sequentially light up, it may indicate that channels which are not adjacent to each other as well as channels adjacent to each other sequentially light up.

In FIG. 1, VIN represents the internal voltage for an operation of the controller 20, SEN represents a sensing voltage used for determining the level of the internal voltage VIN or used for counting synchronization, and GATE represents a control signal for regulation of the output voltage VOUT. The control signal GATE may be provided as a pulse width modulation (PWM) signal.

In the present embodiment, when the battery voltage VB is transmitted to the converter 10 in response to the turn signal T/S, the converter 10 supplies the internal voltage VIN to the controller 20, and supplies the output voltage VOUT to the LED module 50.

Then, the controller 20 repeatedly performs counting by the preset delay time T1 from a falling edge of the counting start signal Start (refer to FIG. 6) that is enabled when the internal voltage VIN reaches the target level, and sequentially light up the first to eighth channels CH1 to CH8 at intervals of the delay time T1. That is, the lamp control device according to the present embodiment sequentially light up the lamp RCL having a direction indication function in the direction that the vehicle makes a turn, such that another driver can recognize the change of direction.

Figure 6:
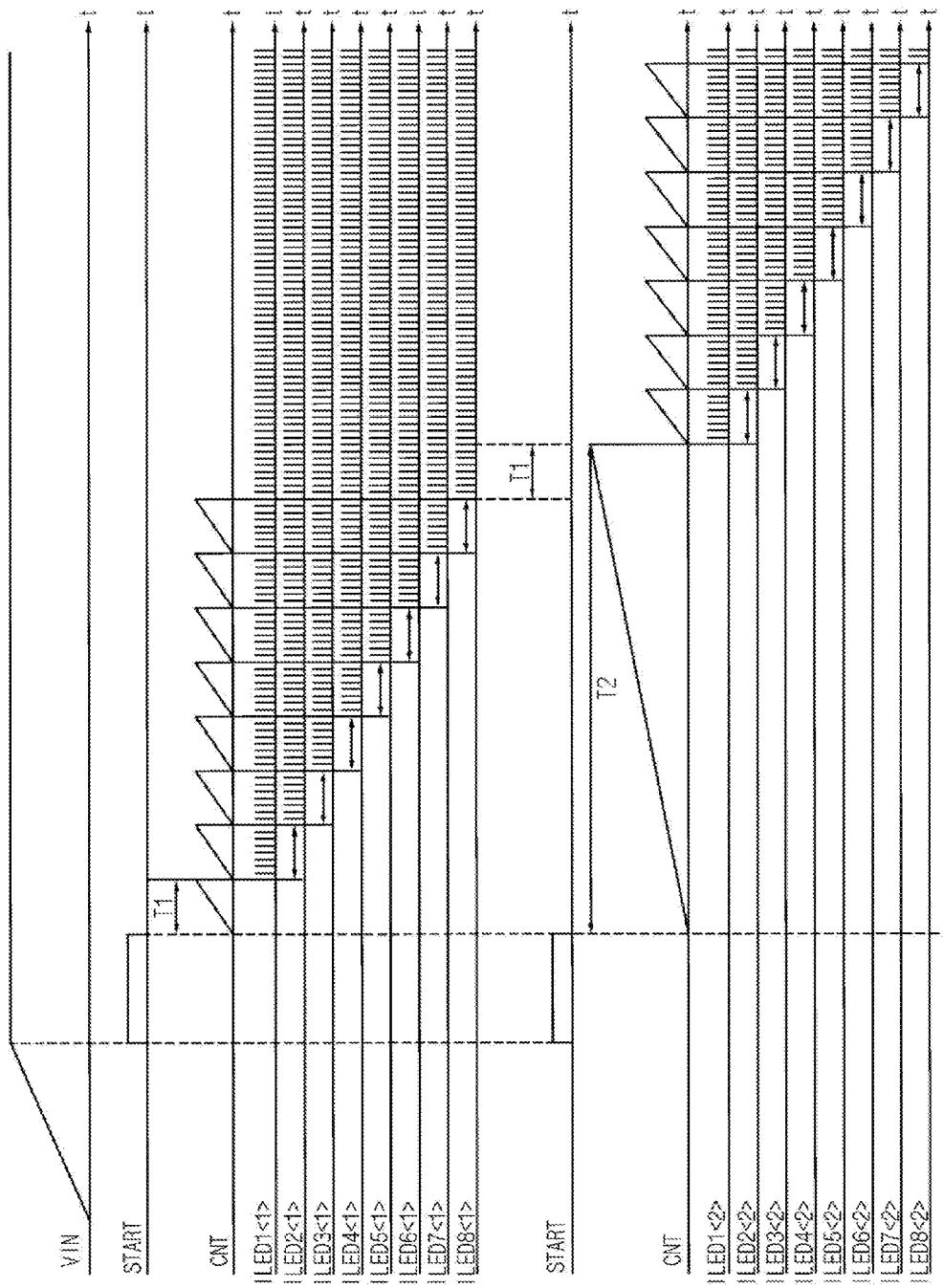
FIG. 6 is a timing diagram for describing a control device of a lamp control device according to an embodiment of the present invention.

The lamp control device according to the present embodiment is configured to sequentially light up the first to eighth channels CH1 to CH8 of the LED module 50 at intervals of the delay time T1 after the delay time T1 has elapsed (refer to FIG. 6). However, this is only an example, and part or all of the delay times T1 between the respective LED channels may be differently set.

Referring to FIG. 1, the MCU 32 of the vehicle controller 30 transmits the battery voltage VB to the paths D2 and D3 of the path unit 40 in response to the emergency stop signal ESS. The battery voltage VB is transmitted to the converter 10 through the path D2, and the dim signal DIM is enabled and transmitted to the controller 20 through the path D3. The emergency stop signal ESS is enabled when the vehicle is suddenly stopped.

The controller 20 receives the dim signal DIM, and selectively controls the first to eighth channels CH1 to CH8 to sequentially light up or simultaneously flicker in response to the logic state of the dim signal DIM. That is, the controller 20 differently controls the turn signal T/S and the emergency stop signal ESS in response to the logic state of the dim signal DIM.

When the dim signal DIM is enabled, the controller 20 repeatedly turn on-off the switching elements for forming current paths between the feedback voltage terminals FB1 to FB8 and the channel resistor terminals RCH1 to RCH8, such that the first to eighth channels CH1 to CH9 of the LED module 50 simultaneously flicker. The flickering cycle may be set in the controller 20 in advance.

As such, the lamp control device according to the present embodiment sequentially light up the lamp RCL to indicate a direction when the dim signal DIM signal is disabled while the internal voltage VIN is supplied, and flickers the lamp RCL for emergency flickering when the dim signal DIM is enabled.

Figure 2:
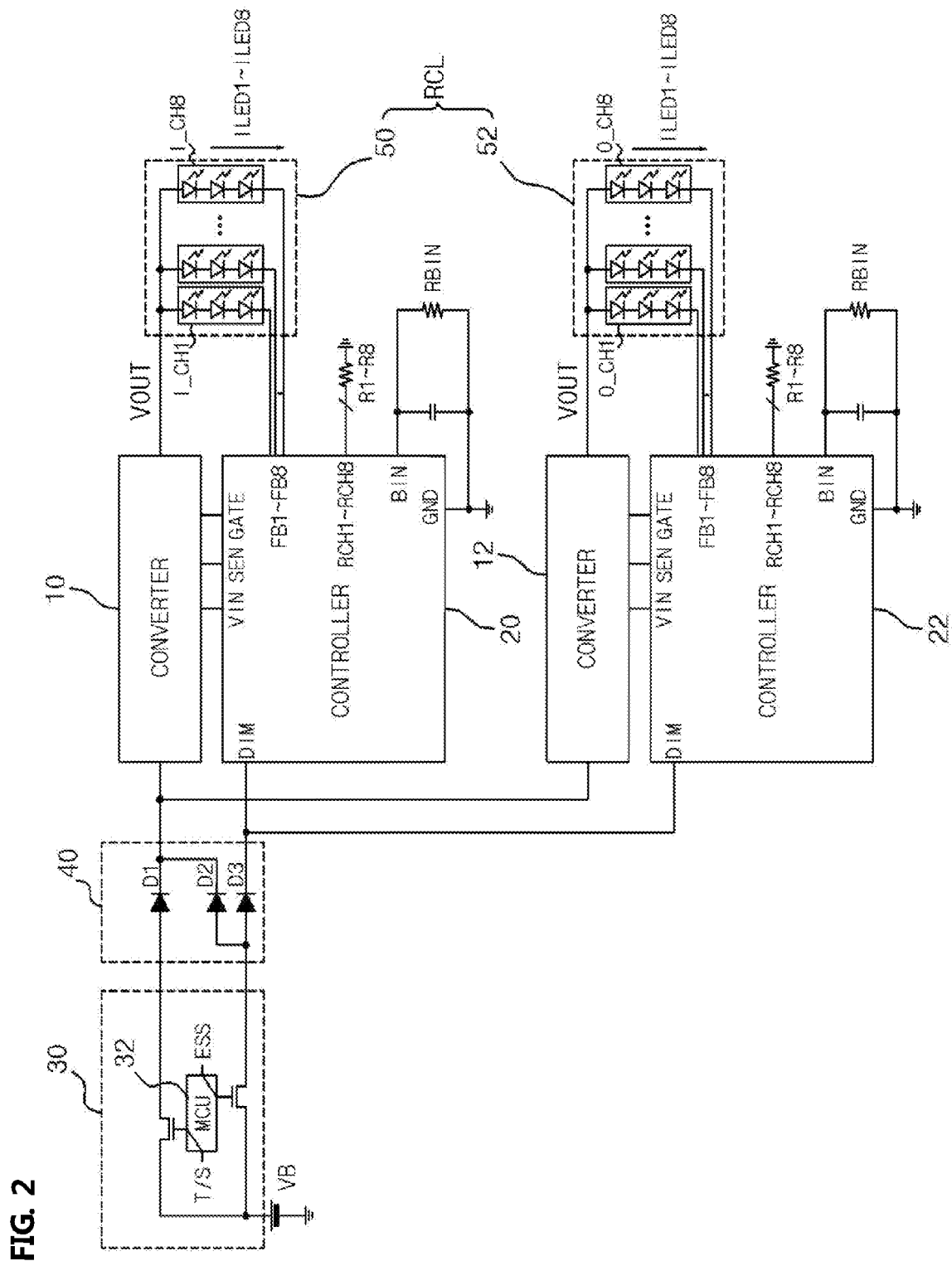
FIG. 2 illustrates a lamp control device according to a second embodiment of the present invention.
Figure 3:
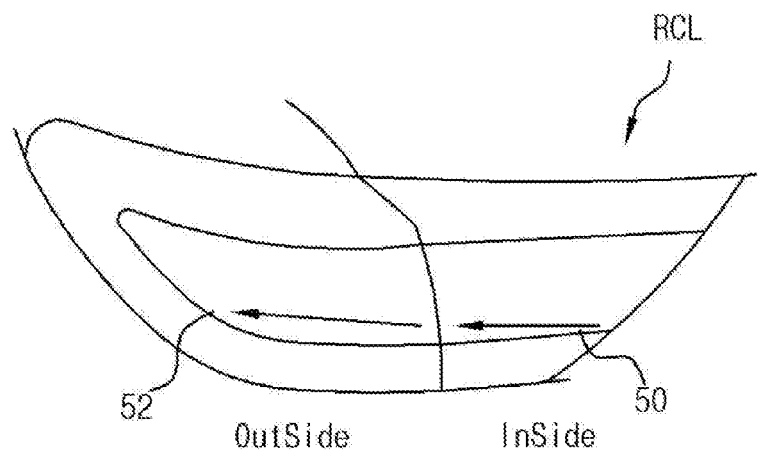
FIG. 3 is a diagram illustrating a turn signal lamp to which the configuration of FIG. 2 is applied.

FIG. 2 illustrates a lamp control device according to a second embodiment of the present invention, and FIG. 3 illustrates a turn signal lamp to which the configuration of FIG. 2 is applied.

Referring to FIG. 2, the lamp control device according to the second embodiment of the present invention includes a lamp RCL, converters 10 and 12 and controllers 20 and 22.

The lamp RCL includes LED modules 50 and 52 each having a plurality of LED channels. FIG. 2 exemplifies that the controller 20 drives LEDs of first to eighth channels I_CH1 to I_CH8 of the LED module 50 and the controller 22 drives LEDs of first to eighth channels O_CH1 to O_CH8 of the module 52.

The lamp RCL may be divided into a lamp installed only on a vehicle body and lamps distributed to the vehicle body and a trunk, depending on the type of a vehicle. The second embodiment may be applied to the lamps distributed to the vehicle body and the trunk as illustrated in FIG. 3. The second embodiment may also be applied to the lamp installed only on the vehicle body, and applied to a lamp RCL that employs a plurality of LED modules requiring a large number of LEDs. However, the present embodiment is not limited thereto. In FIG. 3, the LED module 50 may correspond to the in-side corresponding to the trunk of the vehicle, and the LED module 52 may correspond to the out-side corresponding to the vehicle body.

Referring to FIG. 2, the converters 10 and 12 generate an output voltage VOUT and an internal voltage VIN using the battery voltage VB which is supplied in response to the turn signal T/S, supply the output voltage VOUT to the LED modules 50 and 52, and supply the internal voltage VIN to the controllers 20 and 22. The lamp control device according to present embodiment includes two converters 10 and 12, but may include one converter.

When the internal voltage VIN is supplied from converter 10 while the dim signal DIM is disabled, the controller 20 starts counting a first delay time T1, and sequentially lights up the first to eighth channels CH1 to CH8 of the LED module 50 at intervals of the first delay time T1. The controller 22 starts counting a second delay time T2 at the same time point as the controller 20, and sequentially turns on the first to eighth channels O_CH1 to O_CH8 of the LED module 52 at intervals of the first delay time T1 after completing the counting of the second delay time T2. This configuration will be described in detail as follows.

Referring to FIGS. 2 and 6, the controller 20 starts counting the first delay time T1 from a falling edge of the counting start signal Start that is enabled when the internal voltage VIN reaches a preset target level. When the counting of the first delay time T1 is completed, the controller 20 lights up the first channel I_CH1. In this way, whenever the counting of the first delay time T1 is completed, the controller 20 sequentially lights up the second to eighth channels I_CH2 to I_CH8 of the LED module 50 at intervals of the first delay time T1.

The controller 22 starts counting the second delay time T2 from the same time point as the controller 20 or the falling edge of the counting start signal Start that is enabled when the internal voltage VIN reaches the target level. When the counting of the second delay time T2 is completed, the controller 22 lights up the first channel O_CH1, and starts counting the first delay time T1. Furthermore, whenever the counting of the first delay time T1 is completed, the controller 22 sequentially lights up the second to eighth channels O_CH2 to O_CH8 of the LED module 52 at intervals of the first delay time T1.

The second delay time T2 may be set to a time required until the first delay time T1 elapses after the first to eighth channels I_CH1 to I_CH8 of the LED module 50 driven by the controller 20 have been sequentially lit up. That is, the second delay time T2 for the sequential light-up of the LED module 52 may be set to a longer time than the first delay time T1 for the sequential light-up of the LED module 50.

As such, the controllers 20 and 22 start counting the first and second delay times T1 and T2, respectively, from the falling edge of the counting start signal Start that is enabled when the internal voltage VIN reaches the target level. Then, when the first delay time T1 has elapsed, the controller 20 sequentially lights up the first to eighth channels I_CH1 to I_CH8 of the LED module 50 at intervals of the first delay time T1, and when the second delay time T2 has elapsed, the controller 22 sequentially lights up the first to eighth channels O_CH1 to O_CH8 of the LED module 52 at intervals of the first delay time T1.

As a result, after the first to eighth channels I_CH1 to I_CH8 of the LED module 50 are sequentially lit up, the first to eighth channels O_CH1 to O_CH8 of the LED module 52 are sequentially lit up.

As such, the controllers 20 and 22 according to the present embodiment does not control the LED modules 50 and 52 through mutual communications or carry signals, but independently drive the LED modules 50 and 52 using memory values.

In the present embodiment, the first and second delay times T1 and T2 may be stored in memories (not illustrated) embedded in the controllers 20 and 22, respectively, and the controllers 20 and 22 may be configured to independently drive the LED modules 50 and 52 when the internal voltage VIN reaches the preset target level. For example, the memories may include nonvolatile memories.

Therefore, the controllers 20 and 22 independently start counting from the falling edge of the counting start signal Start that is enabled when the internal voltage VIN reaches the target level, and controls the LED modules 50 and 52 such that the first to eighth channels O_CH1 to O_CH8 of the LED module 52 are sequentially lit up after the first to eighth I_CH1 to I_CH8 of the LED module 50 are sequentially lit up. Thus, although the number of LEDs used for the lamp RCL is increased, the plurality of LED modules 50 and 52 can be stably driven.

The controllers 20 and 22 receive the dim signal DIM, and selectively controls the first to eighth channels CH1 to CH8 to sequentially light up or simultaneously flicker in response to the logic state of the dim signal DIM.

When the internal voltage VIN is supplied while the dim signal DIM is disabled, the controllers 20 and 22 sequentially light up the first to eighth channels I_CH1 to I_CH8 and O_CH1 to O_CH8. Furthermore, when the dim signal DIM is enabled, the controllers 20 and 22 flicker the LED modules 50 and 52 at the same time.

That is, when the dim signal DIM is enabled in response to the emergency stop signal ESS, the controllers 20 and 22 may flicker the LED modules 50 and 52 at the same time, thereby switching the lamp RCL of the direction indication function into the emergency lamp.

Figure 4:
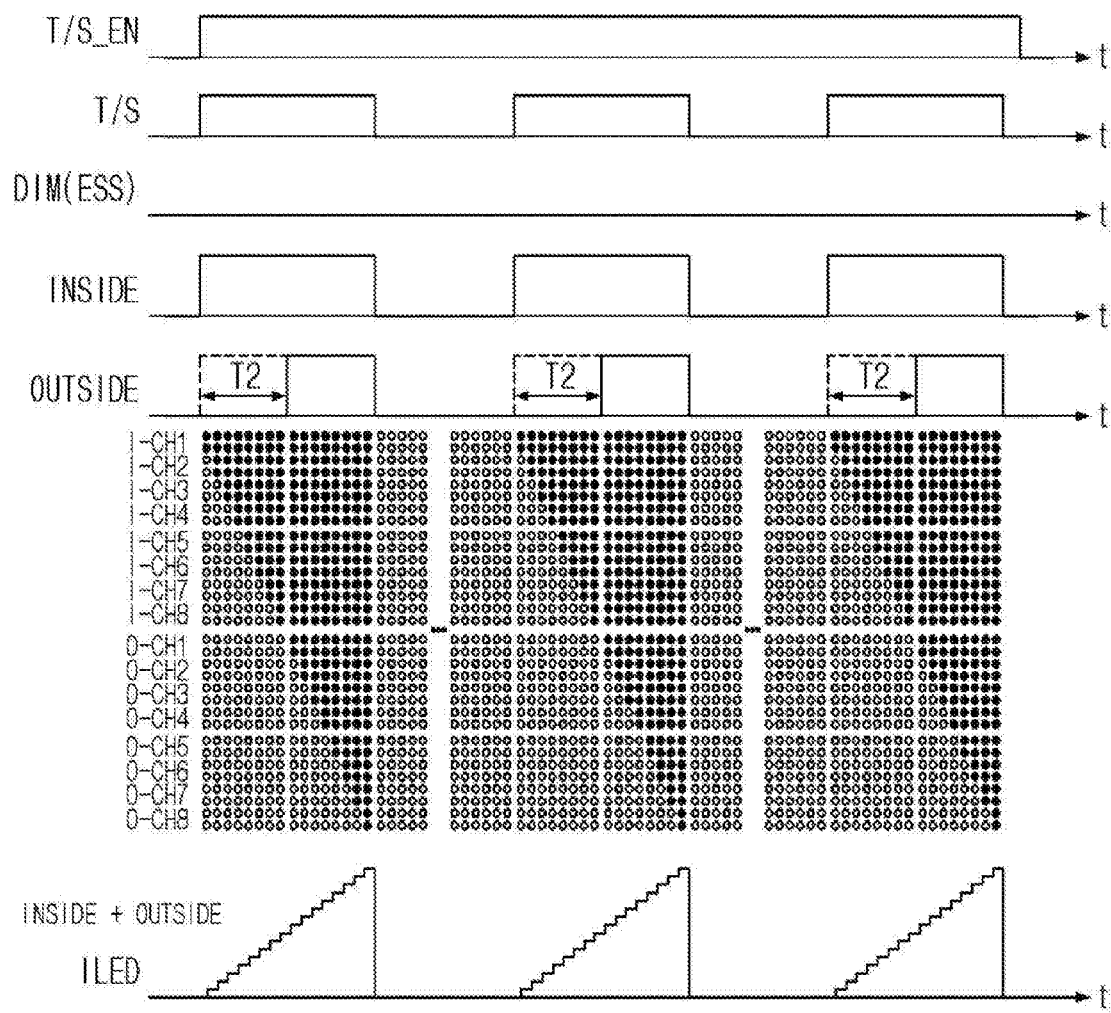
FIGS. 4 and 5 are waveform diagrams for describing an operation process of FIG. 2.
Figure 5:
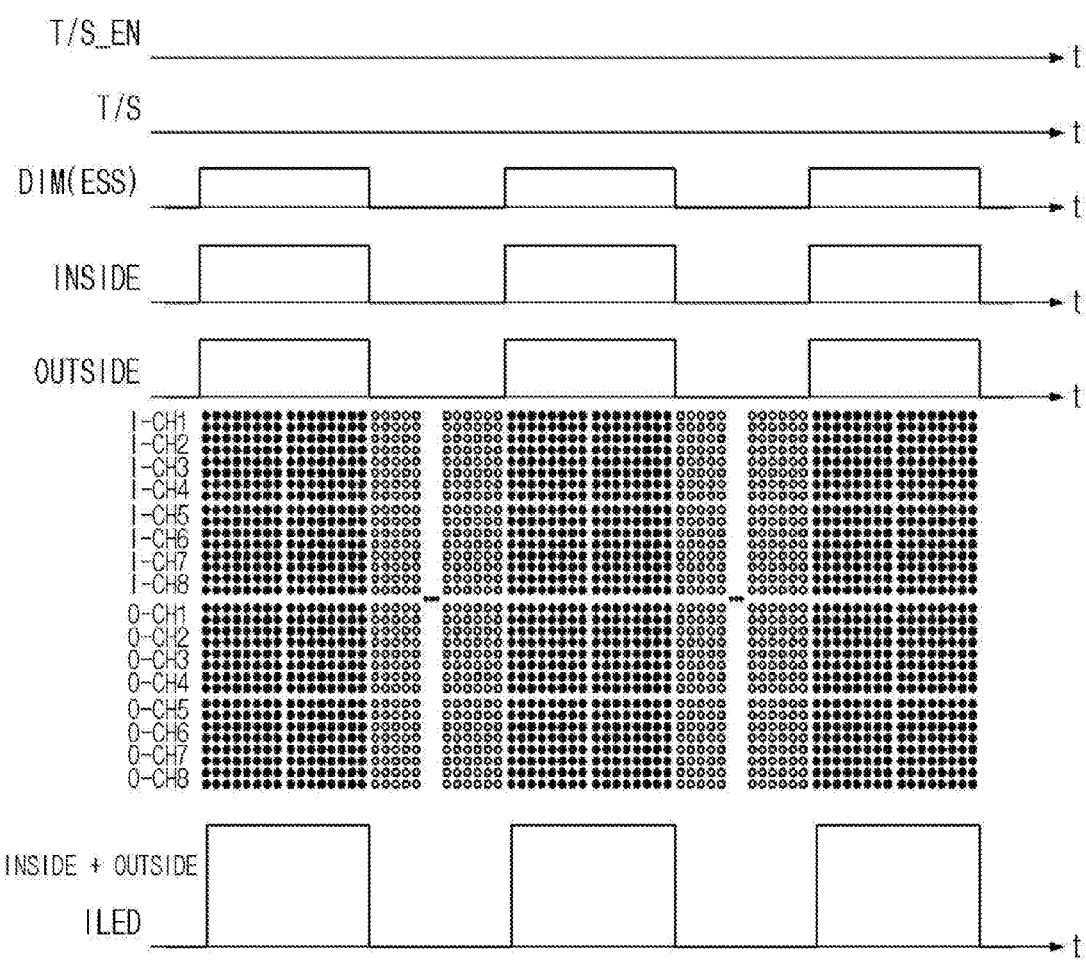

FIG. 3 illustrates a turn signal lamp to which the configuration of FIG. 2 is applied, and FIGS. 4 and 5 are waveform diagrams for describing the operation process of FIG. 2. FIG. 4 is a waveform diagram illustrating the sequential light-up by the turn signal T/S in FIG. 2, and FIG. 5 is a waveform diagram illustrating the simultaneous flickering by the emergency stop signal ESS in FIG. 2.

Referring to FIG. 4, when an enable signal T/S_EN is enabled by a driver's operation of a turn signal switch (not illustrated), the turn signal T/S is periodically enabled.

While the turn signal T/S is enabled, the first to eighth channels I_CH1 to I_CH8 of the LED module 50 corresponding to the in-side of the lamp RCL (refer to FIG. 3) positioned at the trunk of the vehicle are sequentially lit up at intervals of the first delay time T1 after the first delay time T1 has elapsed. In FIG. 4, black-colored circles may indicate that the LED channels are sequentially lit up.

Furthermore, the first to eighth channels O_CH1 to O_CH8 of the second LED module 52 corresponding to the out-side of the lamp RCL positioned on the vehicle body are sequentially lit up at intervals of the first delay time T1 after the second delay time T2 has elapsed.

In this way, the first to eighth channels I_CH1 to I_CH8 and O_CH1 to O_CH8 of the LED modules 50 and 52 are sequentially lit up while the turn signal T/S is enabled, and the total current ILED flowing through the first and second LED modules 50 and 52 increases in a stepwise manner whenever one channel is sequentially lit up.

Referring to FIG. 5, when a driver suddenly puts on the brake, the emergency stop signal ESS is enabled, and the dim signal DIM corresponding to the emergency stop signal ESS is enabled. Then, the LED modules 50 and 52 may simultaneously flicker to function as an emergency lamp. The flickering time and light-up time of the LED modules 50 and 52 may be set to the time that is defined according to the regulations of each country.

FIG. 6 is a timing diagram for describing a control device of a lamp control device according to an embodiment of the present invention. Specifically, FIG. 6 is a timing diagram illustrating the process in which the internal voltage VIN is supplied to the controllers 20 and 22 in response to the turn signal T/S, and the LED modules 50 and 52 are sequentially lit up on a channel basis.

Referring to FIGS. 2 and 6, when the turn signal T/S is enabled, the MCU 32 of the vehicle controller 30 transmits the battery voltage VB to the converter 10. When the battery voltage VB is supplied by the MCU 32, the converter 10 generates the internal voltage VIN and the output voltage VOUT, supplies the internal voltage VIN to the controllers 20 and 22, and supplies the output voltage VOUT to the LED modules 50 and 52.

Referring to FIG. 6, the controller 20 receives the internal voltage VIN from the converter 10, and enables the counting start signal Start when the internal voltage VOUT reaches the target level. The controller 20 starts counting the first delay time T1 from a falling edge of the counting start signal Start. Simultaneously, the controller 22 starts counting the second delay time T2 from the falling edge of the counting start signal Start.

The controller 20 sequentially lights up the first to eighth channels I_CH1 to I_CH8 of the first LED module 50 at intervals of the first delay time T1 after the first delay time T1 has elapsed. In the present embodiment, the lamp control device is configured to sequentially light up the first to eighth channels CH1 to CH8 of the LED module 50 at intervals of the delay time T1 after the delay time T1 has elapsed. However, this is only an example, and part or all of the delay times T1 between the respective channels may be differently set.

The controller 22 starts counting the first delay time T1 when the counting of the second delay time T2 is completed, and sequentially lights up the first to eighth channels O_CH1 to O_CH8 of the LED module 52 at intervals of the first delay time T1. The second delay time t2 may be set to the sum of the first delay time T1 and the time required until all of the channels of the LED module 50 driven by the controller 20 are sequentially lit up.

FIGS. 2 and 6 exemplify that the first to eighth channels O_CH1 to O_CH8 of the LED module 52 corresponding to the controller 22 are sequentially lit up after the first to eighth channels I_CH1 to I_CH8 of the LED module 50 corresponding to the controller 20 are sequentially lit up. However, the present invention may also be applied to a configuration in which first to eighth channels of LED modules corresponding to a plurality of controllers are sequentially lit up, after the first to eighth channels I_CH1 to I_CH8 of the LED module 50 corresponding to one controller 20 are sequentially lit up. The second delay time T2 may be differently set for each of the controllers. For example, the second delay time T2 may be differently set for each of the controllers, such that the first to eighth channels of the plurality of LED modules corresponding to the other controllers are sequentially lit up, after the first to eighth channels I_CH1 to I_CH8 of the LED module 50 corresponding to one controller 50 are sequentially lit up.

When the dim signal DIM corresponding to the emergency stop signal ESS is enabled, the controllers 20 and 22 flicker the LED modules 50 and 52 at the same time, and switch the lamp of the direction indication function into an emergency lamp.

As such, the lamp control device according to the present embodiment can sequentially light up the LED modules 50 and 52 through the counting of the preset delay time, thereby improving the aesthetic sense of the vehicle.

Furthermore, the lamp control device can switch the lamp of the direction indication function into the emergency lamp in response to the emergency stop signal ESS, thereby improving the driving stability while preventing a vehicle accident.

While various embodiments have been described above, it will be understood to those skilled in the art that the embodiments described are by way of example only.

Accordingly, the disclosure described herein should not be limited based on the described embodiments.

What is claimed is:

1. A lamp control device comprising:
a lamp comprising an LED module having a plurality of LED channels;
a converter configured to receive a voltage corresponding to a turn signal, convert the voltage into an output voltage and internal voltage, and supply the output voltage to the LED module; and
a controller configured to start counting a preset delay time when the internal voltage is supplied from the converter, and control the plurality of LED channels to sequentially light up at intervals of the delay time.

2. The lamp control device of claim 1, wherein the controller receives a dim signal corresponding to an emergency stop signal, and controls the plurality of LED channels to sequentially light up or simultaneously flicker in response to the logic state of the dim signal.

3. The lamp control device of claim 2, wherein the controller controls the plurality of LED channels to simultaneously flicker, when the internal voltage is supplied while the dim signal is enabled.

4. The lamp control device of claim 1, wherein part or all of the delay times between the respective LED channels is differently set.

5. A lamp control device comprising:
a lamp comprising first and second LED modules each having LED channels;
a converter configured to receive a voltage corresponding to a turn signal, convert the voltage into an output voltage and internal voltage, and supply the output voltage to the first and second LED modules;
a first controller configured to start counting a first delay time preset when the internal voltage is supplied from the converter, and control the plurality of first LED channels to sequentially light up at intervals of the first delay time; and
a second controller configured to start counting a second delay time preset at the same time point as the first controller when the internal voltage is supplied from the converter, and control the plurality of second LED channels to sequentially light up at intervals of the first delay time after the second delay time has elapsed.

6. The lamp control device of claim 5, wherein the same time point is set to a point of time that the internal voltage reaches a preset target level.

7. The lamp control device of claim 5, wherein the second delay time is set to the sum of the first delay time and a time required until all of the LED channels of the first LED module are sequentially lit up.

8. The lamp control device of claim 5, wherein the first and second controllers receive a dim signal corresponding to an emergency stop signal, and control the plurality of first and second LED channels to sequentially light up or simultaneously flicker in response to the logic state of the dim signal.

9. The lamp control device of claim 8, wherein the first and second controllers flicker the first and second LED modules at the same time, when the internal voltage is supplied while the dim signal is enabled.

10. The lamp control device of claim 5, wherein the converter comprises:
a first converter configured to provide the internal voltage to the first controller and provide the output voltage to the first LED module; and
a second converter configured to provide the internal voltage to the second controller and provide the output voltage to the second LED module.

11. A control method of a lamp control device that performs control using first and second controllers corresponding to first and second LED modules each having LED channels, respectively, the control method comprising the steps of:
(a) starting, by the first controller, counting a first delay time in response to a turn signal, and controlling the LED channels of the first LED module to sequentially light up at intervals of the first delay time; and
(b) starting, by the second controller, counting a second delay time different from the first delay time at the same time point as the first controller in response to the turn signal, and controlling the LED channels of the second LED module to sequentially light up at intervals of the first delay time when the counting of the second delay time is completed.

12. The control method of claim 11, wherein the step (a) comprises:
enabling a counting start signal when an internal voltage corresponding to the turn signal reaches a target level;
repeatedly performing counting by the first delay time based on the counting start signal; and
controlling the LED channels of the first LED module to sequentially light up at intervals of the first delay time.

13. The control method of claim 11, wherein the step (b) comprises:
enabling a counting start signal when an internal voltage corresponding to the turn signal reaches a target level;
counting the second delay time based on the counting start signal; and
controlling the LED channels of the second LED module to sequentially light up at intervals of the first delay time when the counting of the second delay time is completed.

14. The control method of claim 11, wherein the second delay time is set to the sum of the first delay time and a time required until all of the LED channels of the first LED module corresponding to the first controller are sequentially lit up.

15. The control method of claim 11, wherein the steps (a) and (b) comprise controlling the LED channels of the first and second LED modules to simultaneously flicker when a dim signal corresponding to an emergency stop signal is enabled.

* * * * *